(12) United States Patent
Hosokawa

(10) Patent No.: US 8,862,256 B2
(45) Date of Patent: Oct. 14, 2014

(54) ELECTRONIC APPARATUS

(75) Inventor: Shuichi Hosokawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 471 days.

(21) Appl. No.: 13/232,658

(22) Filed: Sep. 14, 2011

(65) Prior Publication Data

US 2012/0081604 A1 Apr. 5, 2012

(30) Foreign Application Priority Data

Sep. 30, 2010 (JP) ................................ 2010-220351

(51) Int. Cl.
| | | |
|---|---|---|
| G06F 17/00 | (2006.01) | |
| H04N 5/60 | (2006.01) | |
| H04N 21/84 | (2011.01) | |
| H04N 21/4363 | (2011.01) | |
| H04N 21/434 | (2011.01) | |
| H04N 21/439 | (2011.01) | |

(52) U.S. Cl.
CPC ............. *H04N 5/602* (2013.01); *H04N 21/84* (2013.01); *H04N 21/43635* (2013.01); *H04N 21/4348* (2013.01); *H04N 21/4392* (2013.01); *H04N 21/4341* (2013.01); *H04N 21/4345* (2013.01)
USPC .......................................................... 700/94

(58) Field of Classification Search
USPC .................... 700/94; 369/1–12; 704/500–504
See application file for complete search history.

(56) References Cited

U.S. PATENT DOCUMENTS

| | | | | |
|---|---|---|---|---|
| 2003/0147629 | A1* | 8/2003 | Kikuchi et al. | 386/69 |
| 2006/0104617 | A1* | 5/2006 | Mukaide et al. | 386/97 |
| 2006/0203622 | A1* | 9/2006 | Arai et al. | 369/1 |
| 2006/0259170 | A1* | 11/2006 | Sasaki et al. | 700/94 |
| 2007/0226769 | A1* | 9/2007 | Waki | 725/127 |
| 2007/0280646 | A1* | 12/2007 | Seita et al. | 386/96 |

FOREIGN PATENT DOCUMENTS

JP 2008-107397 A 5/2008

* cited by examiner

*Primary Examiner* — Andrew C Flanders
(74) *Attorney, Agent, or Firm* — Canon U.S.A., Inc., IP Division

(57) ABSTRACT

An electronic device, where if audio data for transmitting to an external apparatus is changed from first audio data corresponding to an encoded format to non-encoded second audio data, the second audio data is not transmitted to the external apparatus until additional data for transmitting to the external apparatus is changed from first additional data to second additional data.

22 Claims, 10 Drawing Sheets

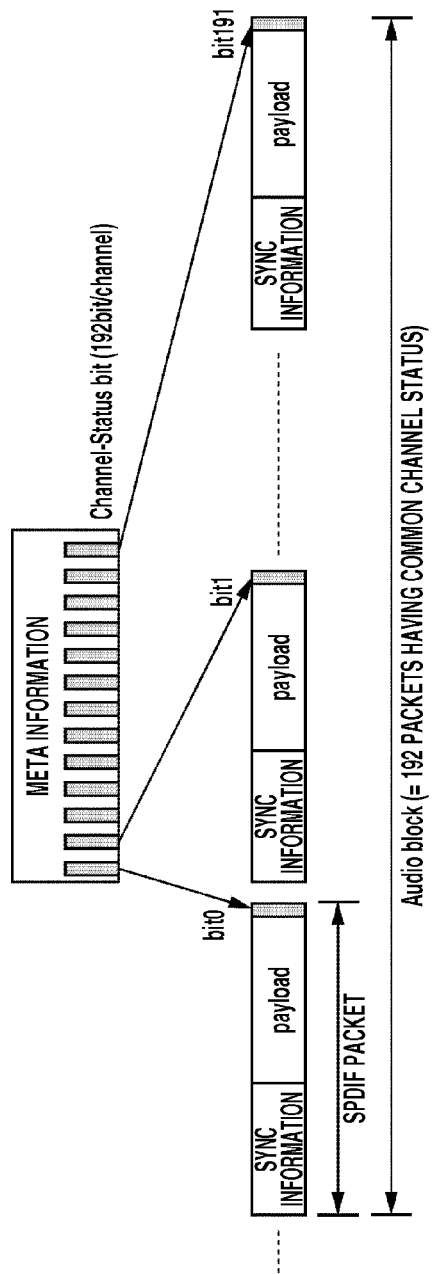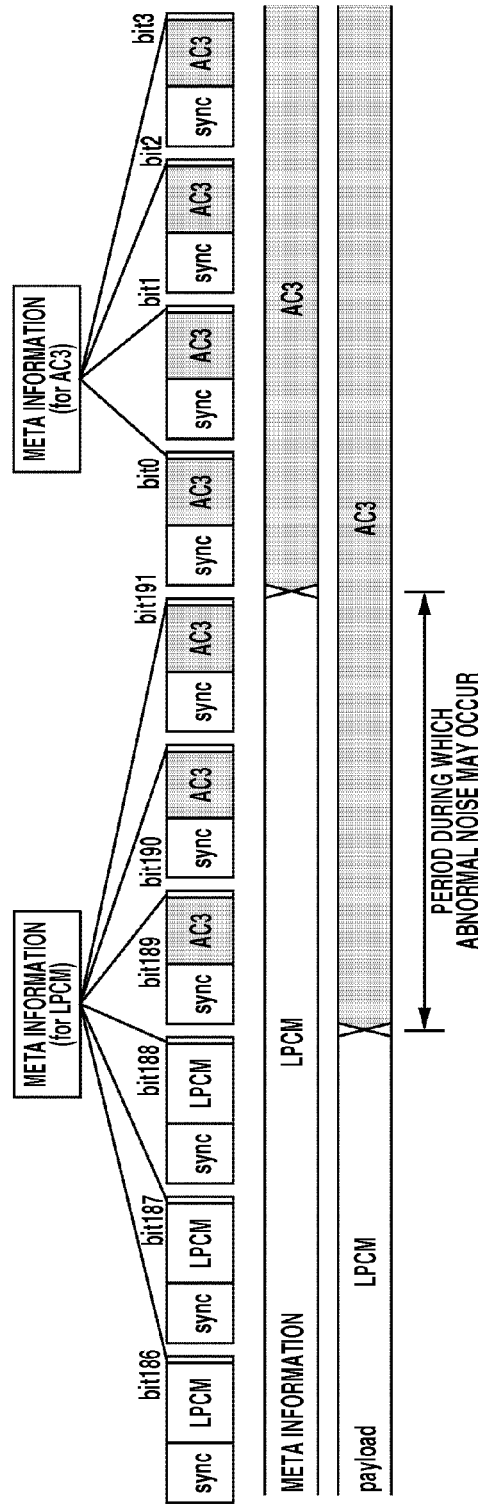

ELECTRONIC APPARATUS

BACKGROUND OF THE INVENTION

1. Field of the Invention

The present invention relates to an electronic device that transmits moving images including video information and audio information which are synchronized with each other.

2. Description of the Related Art

The Sony Philips digital interface format (SPDIF) is a widely used audio data transmission format. For example, the SPDIF is even employed as a part of high definition multimedia interface (HDMI).

SPDIF supports both an uncompressed audio data transmission format (IEC60958) and a compressed audio data transmission format (IEC61973). Since SPDIF allows transmission in such different audio data formats, the SPDIF packets include meta information indicating the transmission audio data format in a payload section that stores the actual data. This meta information is utilized as an audio data format identifier.

This meta information is stored by splitting it into 192 packets per bit. Thus, the meta information can be restored by collecting these 192 packets (FIG. 2A). The 192 packets required to restore the meta information are called an "audio block". During restoration, the meta information cannot be switched. However, there is no stipulation defining the synchronization relationship between the meta information and the payload section. Therefore, when switching the audio data format, a mismatch can occur between the meta information and the payload section. For example, when switching to audio code number 3 (Dolby Digital, "AC3") while the meta information is in linear pulse-code modulation (LPCM) format in an audio block, the receiver mistakes the AC3 data for LPCM data. Consequently, an abnormal noise maybe output for this audio block (FIG. 2B).

Japanese Patent Application Laid-Open No. 2008-107397 discusses a realistic way of switching audio data formats. In the technique discussed in Japanese Patent Application Laid-Open No. 2008-107397, a different signal line to the digital audio signal line (SPDIF) in HDMI is used to notify the receiver of the switching period for the audio data format. The receiver, which has been notified of the switching period, plays back a mute sound during that period without using the transmitted digital audio data. Consequently, the occurrence of an abnormal noise is suppressed.

Since the technique discussed in Japanese Patent Application Laid-Open No. 2008-107397 is based on the using of a special signal, for a general-purpose device, the occurrence of abnormal noise cannot be suppressed. Further, for a transmission method other than HDMI, for example a method in which the video signal is transmitted via a D terminal and the audio signal is transmitted by SPDIF, the technique discussed in Japanese Patent Application Laid-Open No. 2008-107397 can not be applied.

In addition, in the technique discussed in Japanese Patent Application Laid-Open No. 2008-107397, the signal notifying the switching period of the audio data format is asynchronous to the audio data. Consequently, the notification of the switching period has to be performed with a sufficient margin with respect to the switching timing of the audio data format, which means that the mute period is longer.

SUMMARY OF THE INVENTION

Aspects of present invention are directed to providing a moving image transmission apparatus that suppresses the occurrence of abnormal noise and reduces or eliminates an audio gap (mute) period.

According to an aspect of the present invention, an electronic device includes a transmitting unit that transmits first audio data corresponding to an encoded format and first additional data corresponding to the first audio data to an external apparatus, and transmits second audio data that is not encoded and second additional data corresponding to the second audio data to the external apparatus; and a control unit that controls the transmission unit to not transmit the second audio data until additional data for transmitting to the external apparatus is changed from the first additional data to the second additional data if audio data for transmitting to the external apparatus is changed from the first audio data to the second audio data.

According to another aspect of the present invention, an electronic device includes a transmitting unit that transmits first audio data corresponding to an encoded format and first additional data corresponding to the first audio data to an external apparatus, and transmits second audio data that is not encoded and second additional data corresponding to the second audio data to the external apparatus; and a control unit that controls the transmitting unit to not transmit the first audio data until additional data for transmitting to the external apparatus is changed from the second additional data to the first additional data if audio data for transmitting to the external apparatus is changed from the second audio data to the first audio data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain principles of the invention.

FIG. 2 illustrates an example of a configuration of a SPDIF packet and occurrence of an abnormal noise.

DESCRIPTION OF THE EMBODIMENTS

Various exemplary embodiments, features, and aspects of the invention will be described in detail below with reference to the drawings.

The exemplary embodiments according to the present invention will now be described in more detail with reference to the drawings.

Figure 1:
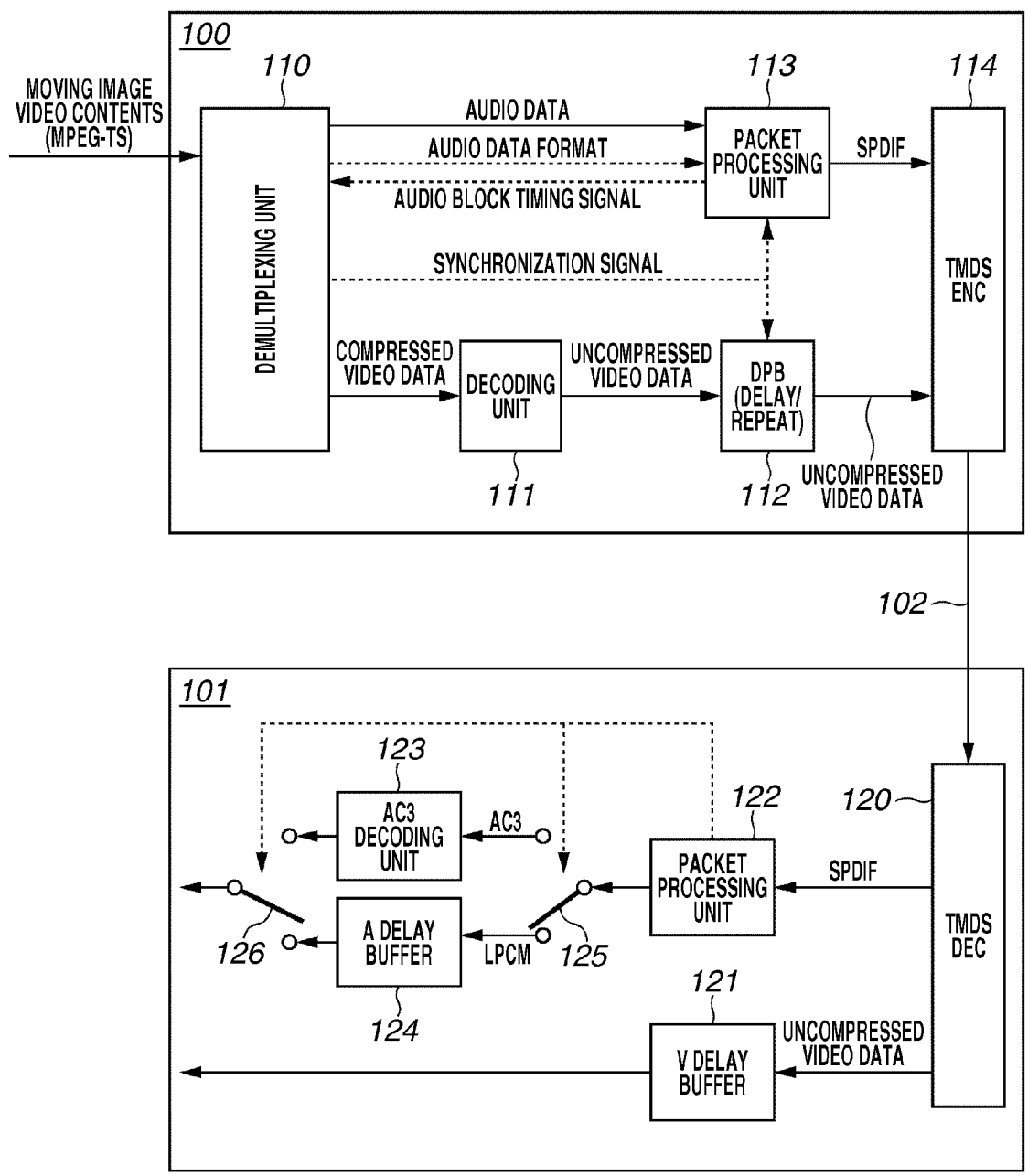
FIG. 1 illustrates an example of schematic configuration blocks according to a first exemplary embodiment of the present invention.

FIG. 1 is a schematic configuration block diagram illustrating a moving image transmission system according to a first exemplary embodiment of the present invention. A transmission apparatus 100 outputs contents including video data and audio data (moving image video data or moving image contents) to a receiving apparatus 101 in an HDMI signal. The receiving apparatus 101 outputs the video data and the audio data received from the transmission apparatus 100 as an HDMI signal to a (not illustrated) monitor and speaker.

An HDMI cable 102 connects the transmission apparatus 100 and the receiving apparatus 101. In the present exemplary embodiment, the moving image contents are a moving picture experts group transport stream (MPEG-TS). A MPEG-TS stream has a presentation time stamp (PTS) and program specific information/service information (PSI/SI) as management information.

The moving image contents are externally input into a separating unit 110. Further, a timing signal (audio block timing signal) indicating an audio block boundary is input from a packet processing unit 113. The separating unit 110 separates video data and audio data from the input moving image contents, and outputs the video data to a decoding unit 111 and the audio data to the packet processing unit 113. Further, when outputting the audio data and the video data, the separating unit 110 separates a synchronization signal from the PTS in the MPEG-TS stream, and supplies the separated synchronization signal to the packet processing unit 113 and a decoded picture buffer (DPB) 112. This synchronization signal is used to determine the timing for outputting the data processed by the packet processing unit 113 and the DPB 112 to a transition minimized differential signaling encoder (TMDS ENC) 114.

In addition, the packet processing unit 113 detects a switch in the audio data format from the PSI/SI in the MPEG-TS stream across a gap in the moving image contents, and selectively executes one or a plurality of the following processes based on the audio block timing signal. A first process is an audio data discard process, in which a part of the audio data in the MPEG-TS is discarded without outputting it to the packet processing unit 113. A second process is a null-burst output process, in which below-described null-burst data is generated and output to the packet processing unit 113. A third process is a repeat process, in which a synchronization signal is generated so that the video data is repeated for one frame. A fourth process is a timing adjustment process, in which the output timing of the audio data is adjusted with respect to the PTS.

The decoding unit 111 decodes compressed video data that is output from the separating unit 110, and outputs the uncompressed video data to the DPB 112.

The DPB 112 is a circuit that temporarily stores the uncompressed data from the decoding unit 111, synchronizes this data with a synchronization signal from the separating unit 110, and delays and adjusts the timing that the uncompressed data is output to the TMDS encoder 114.

The packet processing unit 113 inputs the audio data output from the separating unit 110 into the payload section, and generates meta information, such as a channel status, based on the audio data format information from the separating unit 110. Further, the packet processing unit 113 also generates a SPDIF packet, which is a transmission packet. The packet processing unit 113 synchronizes the generated SPDIF packet with the synchronization signal from the separating unit 110, and outputs the synchronized SPDIF packet to the TMDS encoder 114. In addition, the packet processing unit 113 has a function for discarding a part of the audio data input from the separating unit 110 and inputting desired data into the payload section. The audio data is transmitted in units of fixed length audio blocks, in which 192 SPDIF packets are arranged in one audio block.

The TMDS encoder 114 externally outputs uncompressed video data from the DPB 112 and the SPDIF packet from the packet processing unit 113 based on a TMDS method (TMDS is a trademark of Silicon Image Inc.).

A TMDS signal from the transmission apparatus 100 is input into a TMDS decoder (TMDS DEC) 120 in the receiving apparatus 101 via the HDMI cable 102. The TMDS decoder 120 extracts the uncompressed video data and the audio data in the PDIF packet from the input signal, and outputs the uncompressed video data to a V delay buffer 121 and the audio data in the SPDIF packet to a packet processing unit 122.

The V delay buffer 121 delays the uncompressed video data from the TMDS decoder 120 for a predetermined time, and then outputs the data.

The packet processing unit 122 extracts the meta information and the payload section from the SPDIF packet and outputs them. Further, the packet processing unit 122 detects the audio data format included in the payload section based on the acquired meta information, determines the audio data processing method, and controls switches 125 and 126.

Under the control of the packet processing unit 122, the switch 125 supplies AC3 data from the packet processing unit 122 to an AC3 decoding unit 123, and supplies LPCM data to an A delay buffer 124. The AC3 decoding unit 123 decodes the AC3 data from the switch 125, and outputs LPCM data. The A delay buffer 124 delays the LPCM data from the switch 125 for a predetermined time, and then outputs the data. The switch 126 works with the switch 125 to select output of the AC3 decoding unit 123 or the A delay buffer 124. The LPCM data selected by the switch 126 is externally output.

The transmission operation of the moving image contents according to the present exemplary embodiment will now be described. When the transmission apparatus 100 and the receiving apparatus 101 are connected by the HDMI cable 102, based on a (not illustrated) signal line hot plug detect (HPD) on the HDMI, the transmission apparatus 100 recognizes the connection with the receiving apparatus 101. Further, based on a (not illustrated) signal line display data channel (DDC) in the HDMI, the transmission apparatus 100 confirms configuration information about the receiving apparatus 101, and establishes a connection state.

When the connection state has been established, the transmission apparatus 100 starts to output the moving image contents. The transmission apparatus 100 reads the moving image contents from a (not illustrated) recording medium, and outputs the read moving image contents to the separating unit 110. In the following description, the separating method is MPEG-TS and the audio data format is LPCM or AC3.

The separating unit 110 separates the moving image contents into compressed video data and audio data (LPCM or AC3) based on the PSI/SI in the input MPEG-TS data, and detects the audio data format (LPCM or AC3) from the PSI/SI. Further, the separating unit 110 also performs processing relating to gaps in the moving image contents according to switch or change of the audio data format, or an audio block timing signal from the packet processing unit 113.

The separating unit 110 outputs the separated compressed video data to the decoding unit 111, and outputs a synchronization signal generated based on the PTS to the DPB 112 and the packet processing unit 113. The decoding unit 111 decodes the compressed data from the separating unit 110, and outputs the resultant uncompressed video data to the DPB 112. The DPB 112 outputs the uncompressed video data from the decoding unit 111 to the TMDS encoder 114 at a timing based on the synchronization signal from the separating unit 110.

The separating unit 110 supplies the separated audio data and the audio data format information to the packet processing unit 113. The packet processing unit 113 generates a SPDIF packet based on the audio data from the separating unit 110, and generates a channel status bit as meta information based on the audio data format. The packet processing unit 113 outputs the SPDIF packet to the TMDS encoder 114 at a timing based on the synchronization signal from the separating unit 110.

The TMDS encoder 114 converts the uncompressed audio data from the DPB 112 and the audio data in a SPDIF packet format from the packet processing unit 113 into a TMDS signal, and outputs this signal to the HDMI cable 102.

When a connection has been established with the transmission apparatus 100, the receiving apparatus 101 starts to receive the video and audio data. The TMDS decoder 120 demultiplexes the uncompressed audio data and the SPDIF packet from the TMDS signal received from the HDMI cable 102, and outputs the uncompressed audio data to the V delay buffer 121 and the SPDIF packet to the packet processing unit 122.

The V delay buffer 121 delays the uncompressed video data from the TMDS decoder 120 for a predetermined time, and then outputs the data to a (not illustrated) external monitor, for example.

The packet processing unit 122 acquires the audio data format information from the channel status bit in the meta information in the SPDIF packet received from the TMDS decoder 120, and selects the audio data decoding processing method. More specifically, if the audio data is encoded in an AC3 format, the packet processing unit 122 controls switches 125 and 126 so that the AC3 decoding unit 123 is selected. Conversely, if the audio data is encoded in a LPCM format, the packet processing unit 122 controls the switches 125 and 126 so that the A delay buffer 124 is selected. The packet processing unit 122 outputs the audio data (AC3 or LPCM) to be put into the payload section of the SPDIF packet, to the switch 125. The AC3 decoding unit 123 decodes the AC3 audio data from the switch 125, and outputs the obtained LPCM audio data to the switch 126. The A delay buffer 124 delays the LPCM audio data from the switch 125 for a predetermined time, and then outputs the data to the switch 126.

Figure 3:
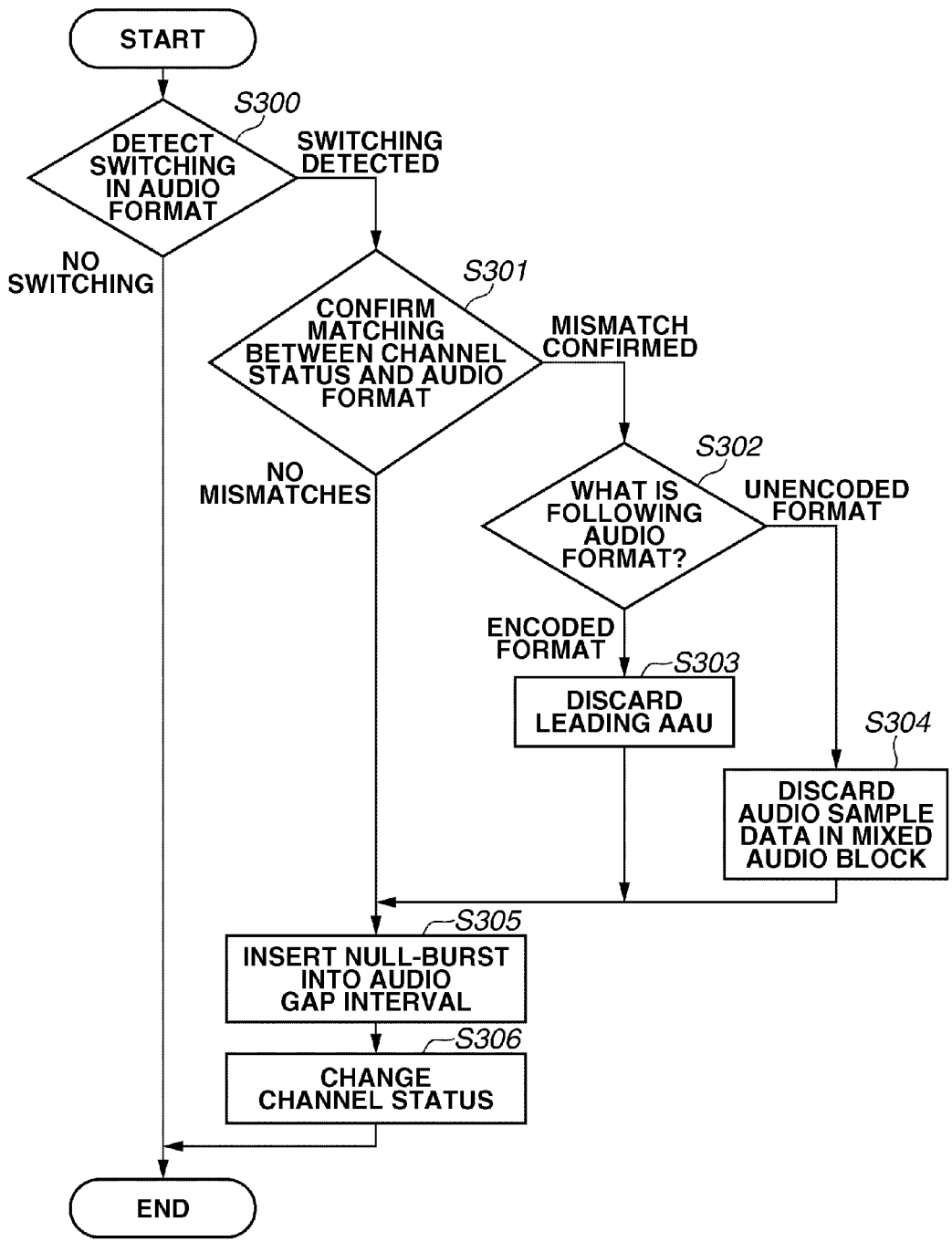
FIG. 3 is a flowchart illustrating an example of audio output process according to the first exemplary embodiment.
Figure 4A:
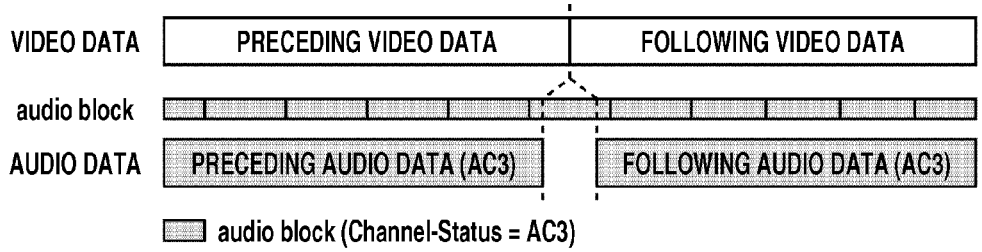
FIGS. 4A, 4B, and 4C illustrate examples of audio data transmission timing in the process illustrated in FIG. 3.

The audio data transmission process performed by the transmission apparatus 100 will now be described with reference to FIGS. 3 and 4. FIG. 3 is a flowchart illustrating the audio data output process performed by the transmission apparatus 100. FIGS. 4A, 4B, and 4C are timing charts illustrating examples of the transmission timing.

In step S300, the separating unit 110 detects whether the audio data format switches across a gap in the moving image contents from PSI/SI, in other words, detects whether there is a change in the audio data format. As illustrated in FIG. 4A, if the audio data format does not switch across a gap in the moving image contents (both AC3) (NO SWITCH in step S300), the packet processing unit 113 does not perform any specific process, and continues outputting audio data based on the synchronization signal (i.e., the process illustrated in FIG. 3 is finished). As illustrated in FIGS. 4B or 4C, if there is a switch in the audio data format across a gap in the moving image contents (in the illustrated example, a switch from AC3 to LPCM) (SWITCH DETECTED in step S300), the process proceeds to step S301. FIG. 4B illustrates a case in which audio data output of the following moving image contents is not included within the audio block outputting the audio data of the preceding moving image contents. FIG. 4C illustrates a case in which audio data output of the following moving image contents is included within the audio block outputting the audio data of the preceding moving image contents.

In step S301, the separating unit 110 confirms the audio block timing signal from the packet processing unit 113 and the audio data format switching timing. As illustrated in FIG. 4B, if there are no different audio data format output timings in the same audio block (NO MISMATCHES in step S301), the process proceeds to step S305. In step S305, the process required for audio data format switching is performed. Conversely, as illustrated in FIG. 4C, if there are different audio data format output timings in the same audio block (MISMATCH CONFIRMED in step S301), the process proceeds to step S302.

In step S302, the packet processing unit 113 determines whether the audio data format of the audio data temporally placed after the timing at which the audio data format switches, in other words, the audio data format of the following audio data, is an encoded format. If this audio data format is an encoded format (AC3) (ENCODED FORMAT in step S302), the process proceeds to step S303. If this audio data format is not an encoded format (LPCM) (UNENCODED FORMAT in step S302), the process proceeds to step S304.

In step S303, the packet processing unit 113 discards the leading audio access unit (AAU) in the following audio data. Since the AAU size of the AC3 is sufficiently larger than the audio block size, if the leading AAU is discarded, the AC3 audio data in a mixed audio block can be discarded.

In step S304, the packet processing unit 113 discards the LPCM data in the audio blocks in which audio data formats are mixed.

Figure 4B:
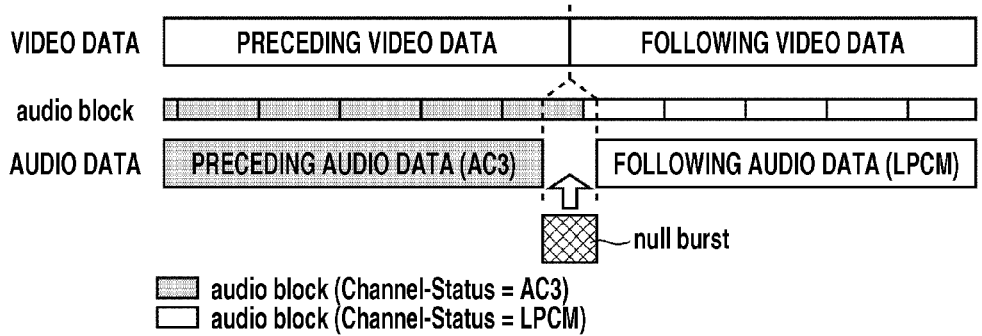
Figure 4C:
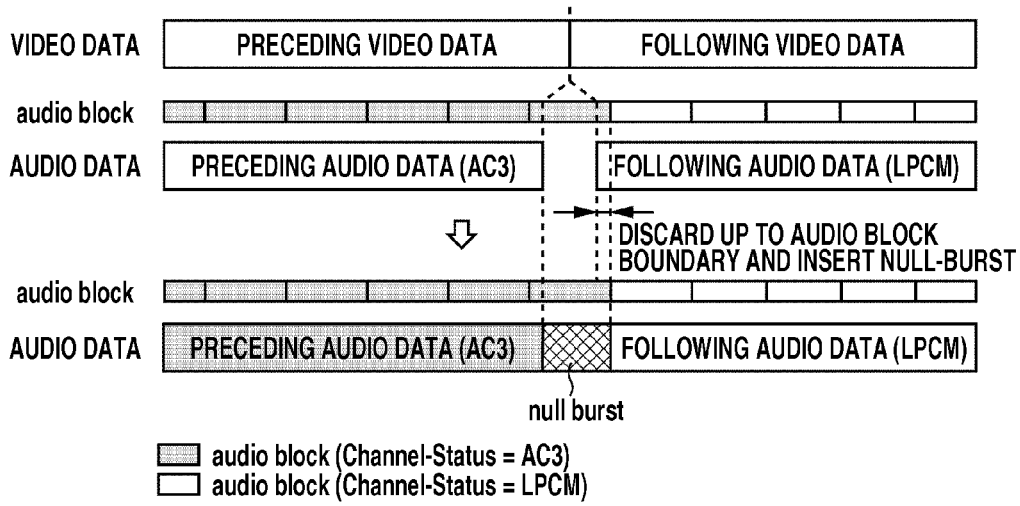

Based on the process performed in steps S302 to S304, the output from the packet processing unit 113 in the case of FIG. 4C becomes the same as that illustrated in FIG. 4B. Consequently, only one type of audio data format is present in the same audio block.

In step S305, the packet processing unit 113 inserts or arranges null-burst data across a gap in the moving image contents between the audio data tail of the preceding moving image contents and the start of the audio data of the following moving image contents. Null-burst data is a signal that the transmission apparatus should output when the audio data format is switched by a transmission based on SPDIF. Since null-burst data is described in detail in IEC61973, further description will be omitted here. If the audio data format of the following audio data is an encoded format (AC3) (ENCODED FORMAT in step S302), the CPU 13 first inserts a null-burst between the audio data tail of the preceding moving image contents and the start of the audio data of the following moving image contents, and then inserts the leading AAU in the head of the following moving image contents.

In step S306, the packet processing unit 113 switches the audio data format signal from the audio block timing which includes the start of the audio data of the following moving image contents. Consequently, a channel status that supports the following moving image contents is output.

Thus, in the present exemplary embodiment, the channel status, which is meta information, and the payload can be made to match even if the audio data format switches across a gap in the moving image contents, so that an abnormal noise can be suppressed with the minimum mute period.

In the present exemplary embodiment, although the interface between the transmission apparatus and the receiving apparatus was an HDMI, the same advantageous effects can be obtained as long as the audio data transmission has a SPDIF or similar packet structure. Further, although AC3/LPCM were described as examples for the audio data format, aspects of the present invention are not limited to this combination.

Figure 5:
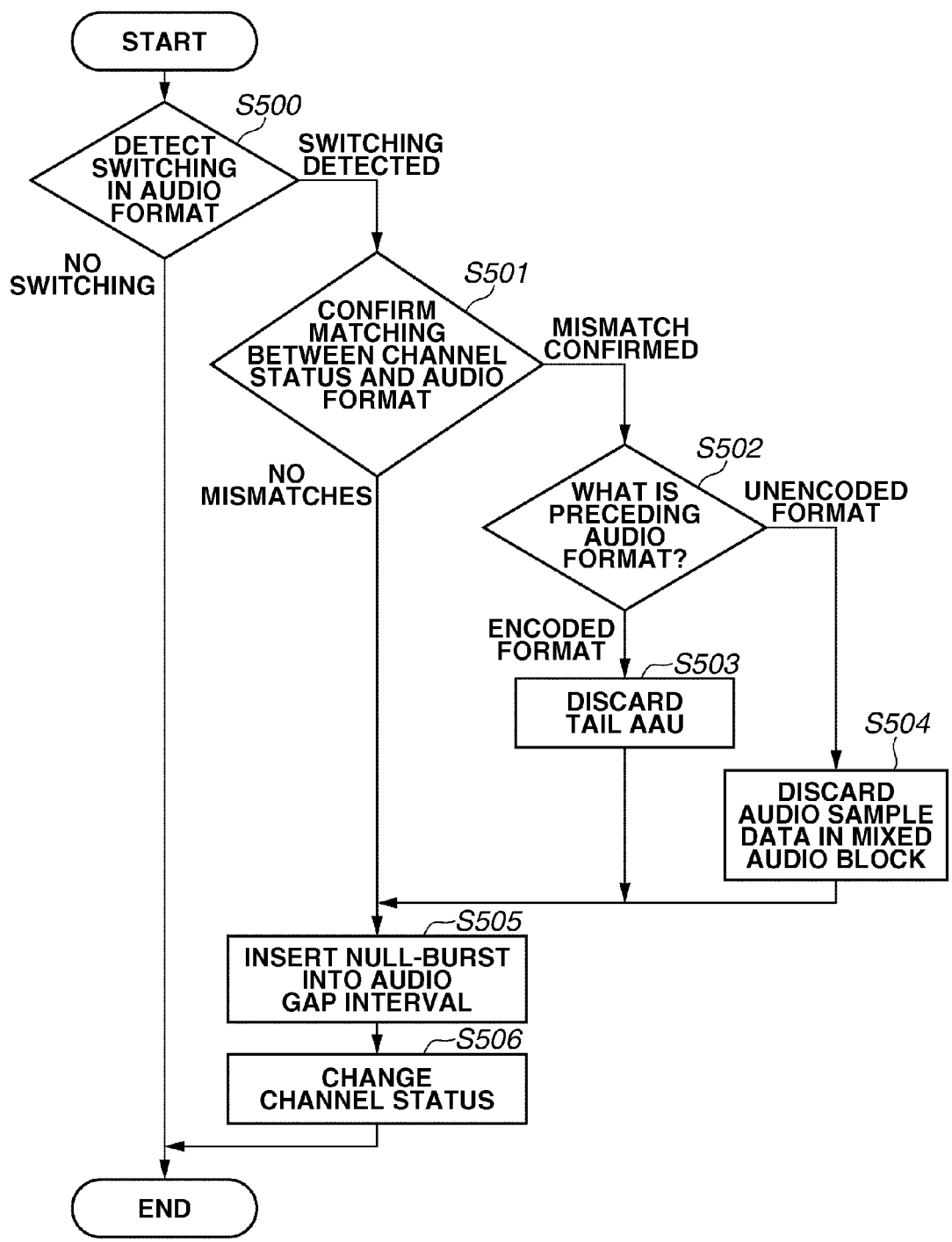
FIG. 5 is a flowchart illustrating an example of different audio data output process according to a second exemplary embodiment.
Figure 6A:
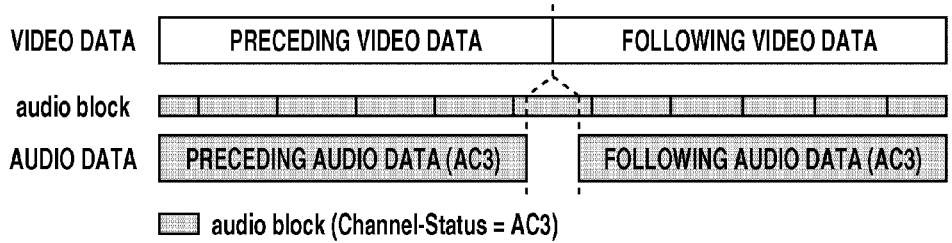
FIGS. 6A, 6B, and 6C illustrate examples of audio data transmission timing in the process illustrated in FIG. 5.
Figure 6B:
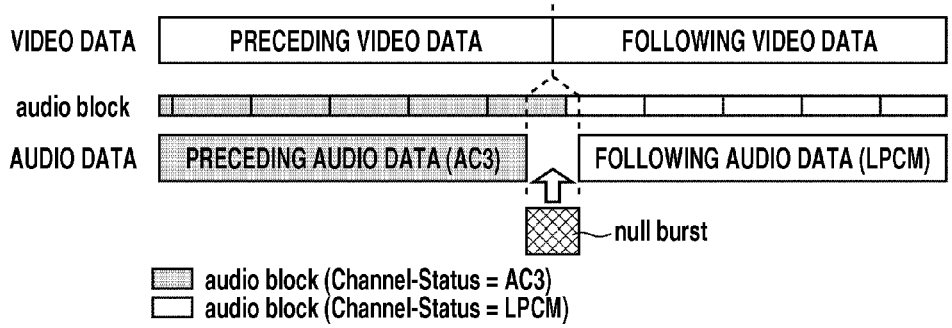
Figure 6C:
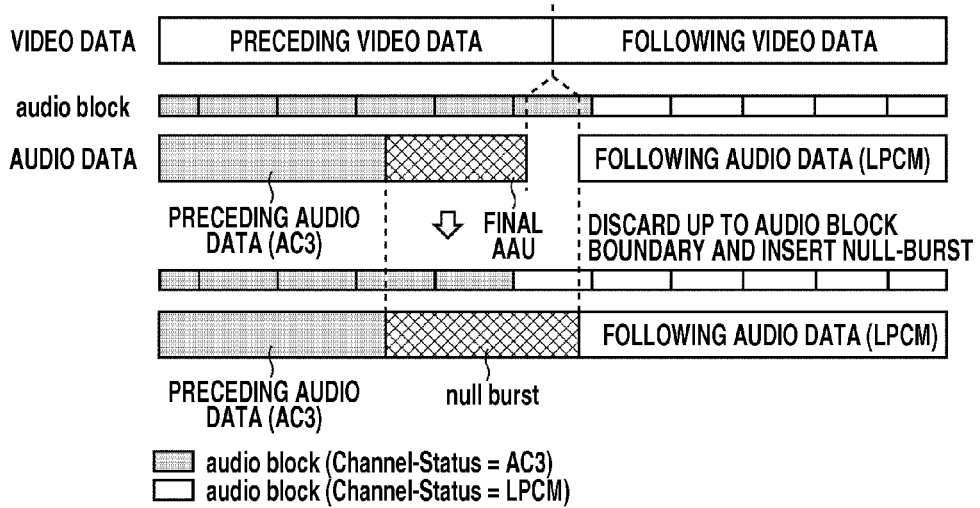

A second exemplary embodiment will now be described. Instead of discarding the start of the audio data of the following moving image contents, the tail of the audio data of the preceding moving image contents may be discarded. FIG. 5 is a flowchart illustrating that audio data output process. FIGS. 6A, 6B, and 6C illustrate transmission timing examples.

In step S500, the separating unit 110 detects whether the audio data format switches across a gap in the moving image contents, from PSI/SI, in other words, detects whether there is a change in the audio data format. As illustrated in FIG. 6A, if the audio data format does not switch across a gap in the moving image contents (both AC3) (NO SWITCH in step S500), the packet processing unit 113 does not perform any specific process, and continues outputting audio data based on the synchronization signal (i.e., the process illustrated in FIG. 5 is finished). As illustrated in FIGS. 6B or 6C, if there is a switch in the audio data format across a gap in the moving image contents (in the illustrated example, a switch from AC3 to LPCM) (SWITCH DETECTED in step S500), the process proceeds to step S501. FIG. 6B illustrates a case in which audio data output of the following moving image contents is not included within the audio block outputting the audio data of the preceding moving image contents. FIG. 6C illustrates a case in which audio data output of the following moving image contents is included within the audio block outputting the audio data of the preceding moving image contents.

In step S501, the separating unit 110 confirms the audio block timing signal from the packet processing unit 113 and the audio data format switching timing. As illustrated in FIG. 6B, if there are no different audio data format output timings in the same audio block (NO MISMATCHES in step S501), the process proceeds to step S505. In step S505, the process required for audio data format switching is performed. Conversely, as illustrated in FIG. 6C, if there are different audio data format output timings in the same audio block (MISMATCH CONFIRMED in step S501), the process proceeds to step S502.

In step S502, the packet processing unit 113 determines whether the audio data format of the audio data temporally preceding the switch in the audio data format, in other words, the audio data format of the preceding audio data, is an encoded format. If this audio data format is an encoded format (AC3) (ENCODED FORMAT in step S502), the process proceeds to step S503. If this audio data format is an unencoded format (LPCM) (UNENCODED FORMAT in step S502), the process proceeds to step S504.

In step S503, the packet processing unit 113 discards the AC3 audio data in a mixed audio block by discarding the AAU in the tail of the preceding audio data.

In step S504, the packet processing unit 113 discards the LPCM data in the audio blocks in which audio data formats are mixed.

Based on the process performed in steps S502 to S504, the output from the packet processing unit 113 in the case of FIG. 6C becomes the same as that illustrated in FIG. 6B. Consequently, only one type of audio data format is present in the same audio block.

In step S505, the packet processing unit 113 inserts or arranges null-burst data across a gap in the moving image contents between the audio data tail of the preceding moving image contents and the start of the audio data of the following moving image contents. If the audio data format of the preceding audio data is an encoded format (AC3) (ENCODED FORMAT in step S302), the CPU 13 first inserts a null-burst between the audio data tail of the preceding moving image contents and the start of the audio data of the following moving image contents, and then inserts the tail AAU at the end of the preceding moving image contents.

In step S506, the packet processing unit 113 switches the audio data format signal from the audio block timing which includes the start of the audio data of the following moving image contents. Consequently, a channel status that supports the following moving image contents is output.

Figure 7:
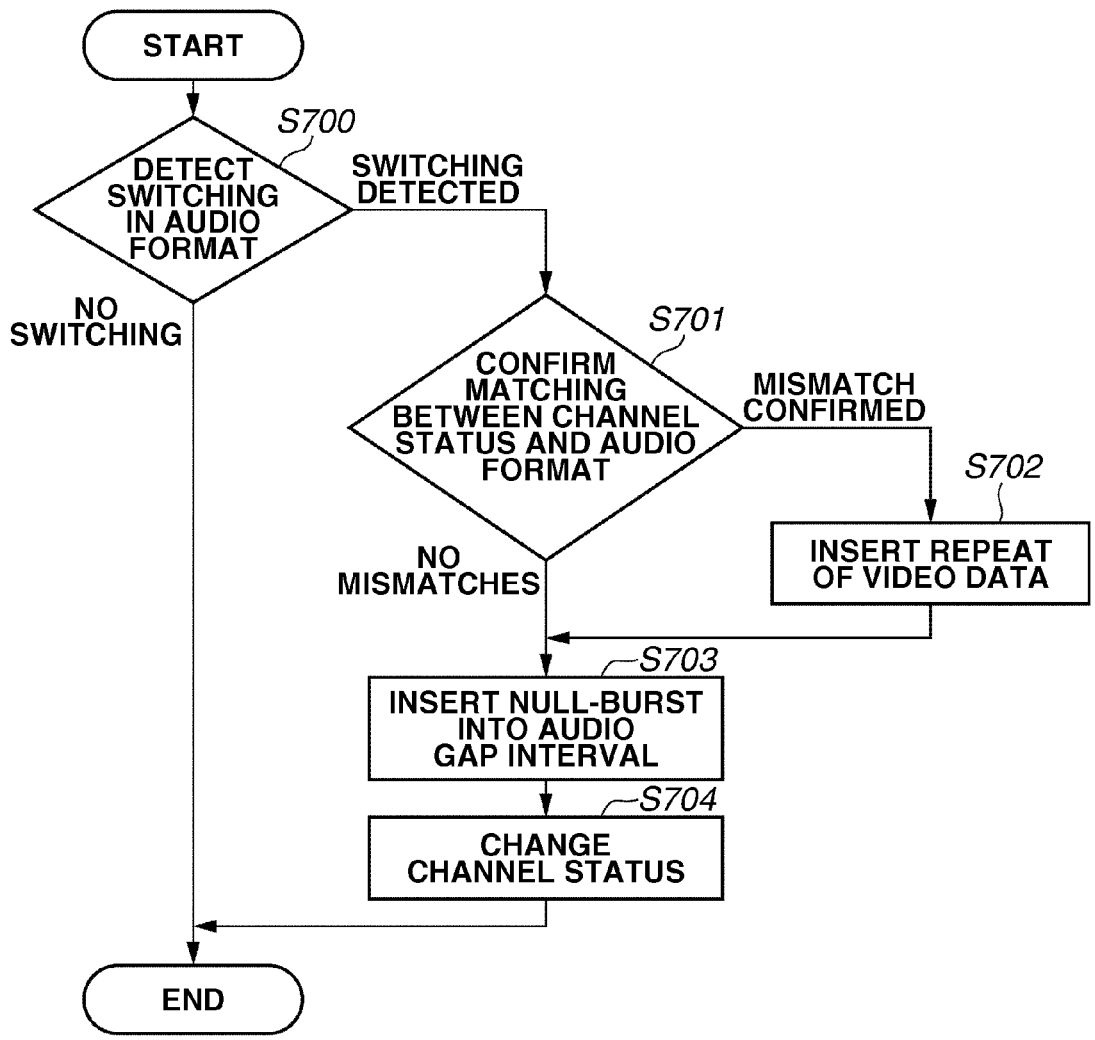
FIG. 7 is a flowchart illustrating an example of different audio data output process according to a third exemplary embodiment.
Figure 8A:
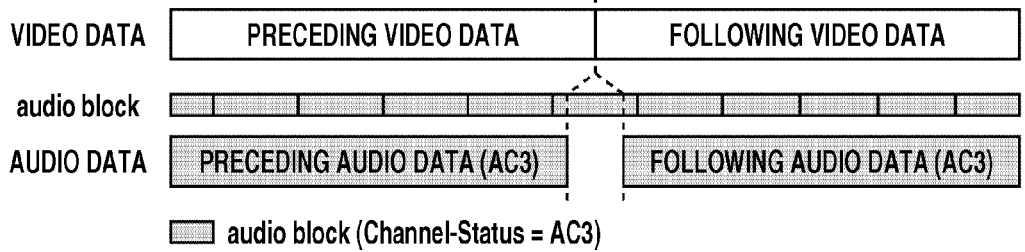
FIGS. 8A, 8B, and 8C illustrate examples of audio data transmission timing in the process illustrated in FIG. 7.
Figure 8B:
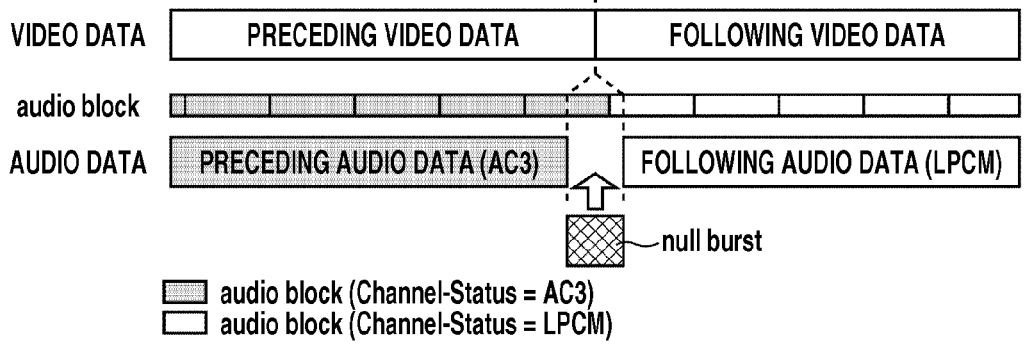
Figure 8C:
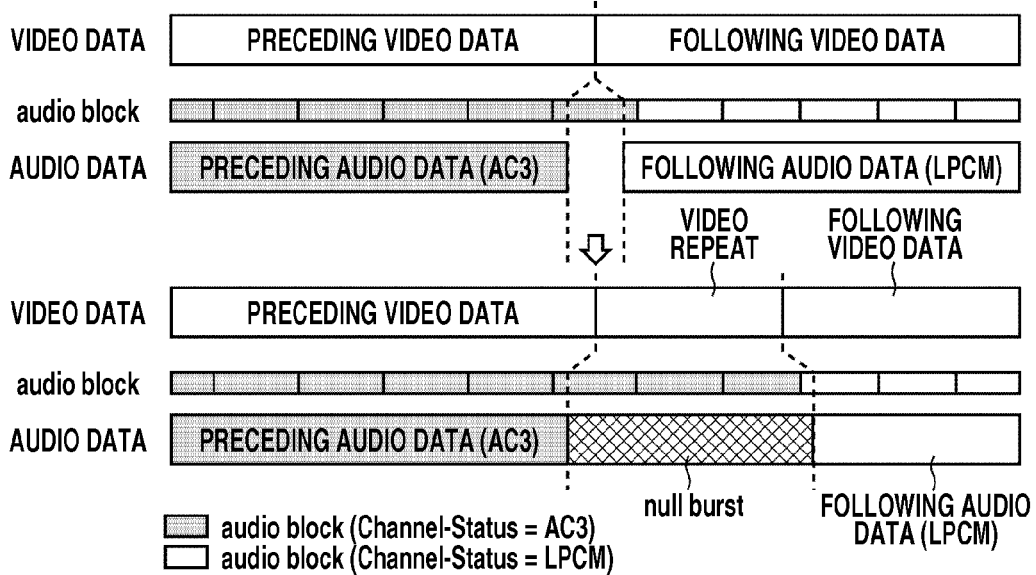

A third exemplary embodiment will now be described. An operation will be described in which the final piece of output video data in the preceding moving image contents is repeated. FIG. 7 is a flowchart illustrating audio data output process performed for that purpose. FIGS. 8A, 8B, and 8C illustrate transmission timing examples.

In step S700, the separating unit 110 detects whether the audio data format switches across a gap in the moving image contents, from PSI/SI. As illustrated in FIG. 8A, if the audio data format does not switch across a gap in the moving image contents (both AC3) (NO SWITCH in step S700), the packet processing unit 113 does not perform any specific process, and continues outputting audio data based on the synchronization signal (i.e., the process illustrated in FIG. 7 is finished). As illustrated in FIGS. 8B or 8C, if there is a switch in the audio data format across a gap in the moving image contents (in the illustrated example, a switch from AC3 to LPCM) (SWITCH DETECTED in step S700), the process proceeds to step S701. FIG. 8B illustrates a case in which audio data output of the following moving image contents is not included within the audio block outputting the audio data of the preceding moving image contents. FIG. 8C illustrates a case in which audio data output of the following moving image contents is included within the audio block outputting the audio data of the preceding moving image contents.

In step S701, the separating unit 110 confirms the audio block timing signal from the packet processing unit 113 and the audio data format switching timing. As illustrated in FIG. 8B, if there are no different audio data format output timings in the same audio block (NO MISMATCHES in step S701), the process proceeds to step S703. In step S703, the process required for audio data format switching is performed. Conversely, as illustrated in FIG. 8C, if there are different audio data format output timings in the same audio block (MISMATCH CONFIRMED in step S701), the process proceeds to step S702.

In step S702, the separating unit 110 repeats one frame at the tail of the video data in the preceding moving image contents. More specifically, repeat video data is generated by delaying the output timing of the following moving image contents to the DPB 112 by one frame. Together with this, the output timing of the video and audio data in the following moving image contents is delayed by one frame. Based on this process, the output from the packet processing unit 113 in the case of FIG. 8C becomes the same as that illustrated in FIG. 8B. Consequently, only one type of audio data format is present in the same audio block.

In step S703, the packet processing unit 113 inserts or arranges null-burst data across a gap in the moving image contents between the audio data tail of the preceding moving image contents and the start of the audio data of the following moving image contents.

In step S704, the packet processing unit 113 switches the audio data format signal from the audio block timing which includes the start of the audio data of the following moving image contents. Consequently, a channel status that supports the following moving image contents is output.

Figure 9:
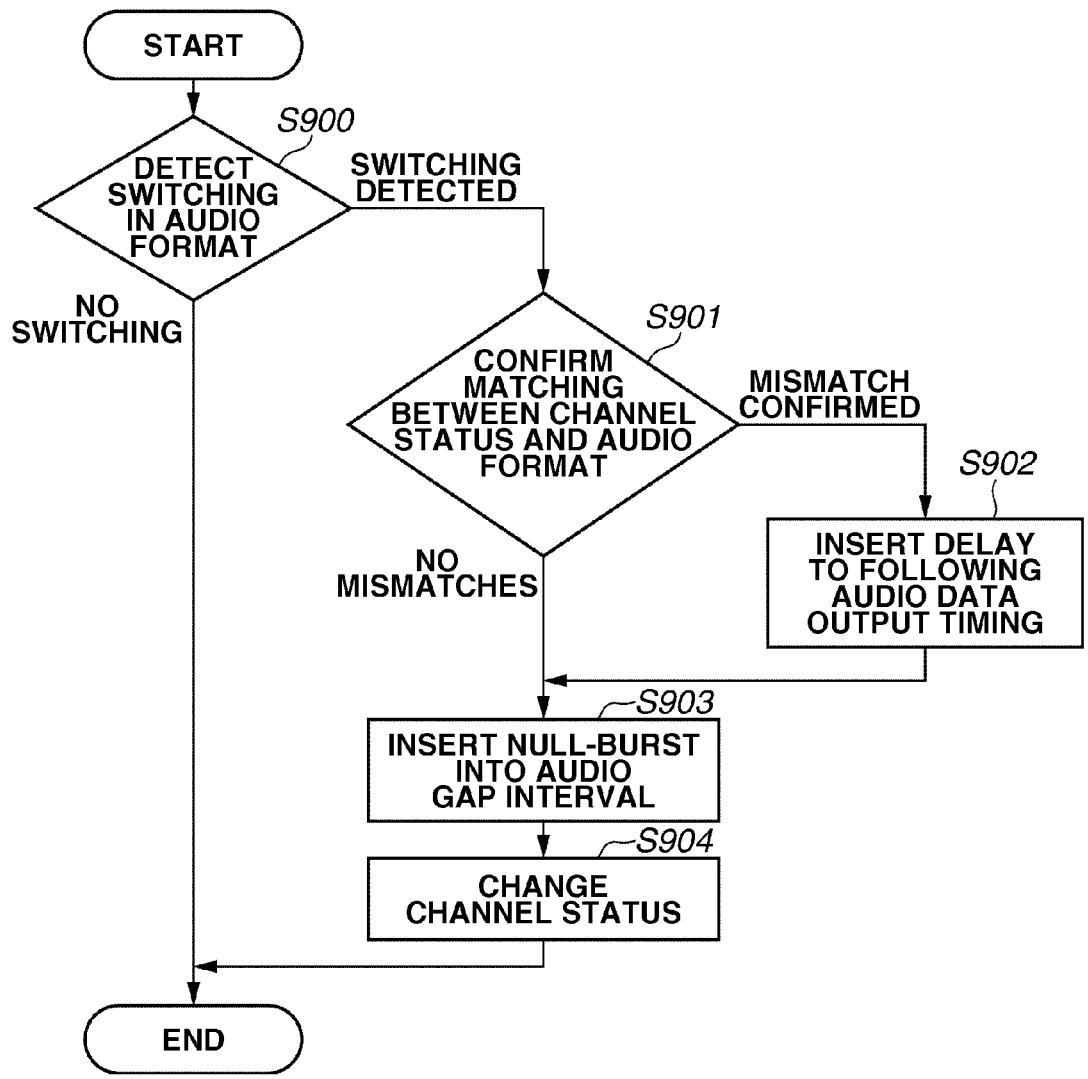
FIG. 9 is a flowchart illustrating an example of different audio data output process according to a fourth exemplary embodiment.
Figure 10A:
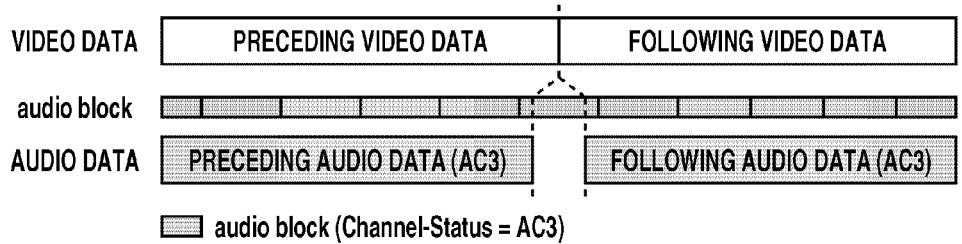
FIGS. 10A, 10B, and 10C illustrate examples of audio data transmission timing in the process illustrated in FIG. 9.
Figure 10B:
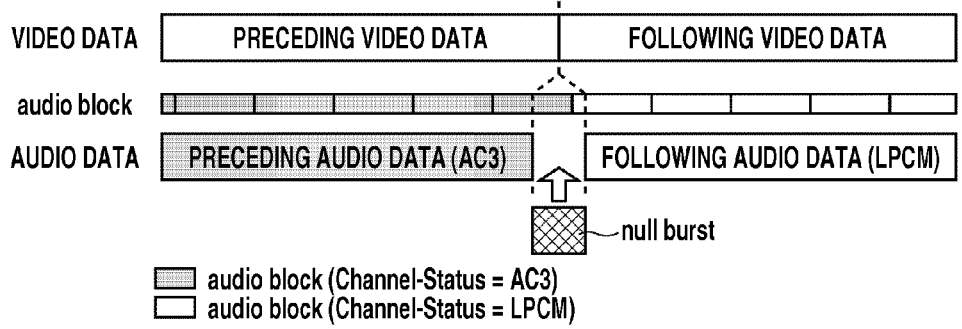
Figure 10C:
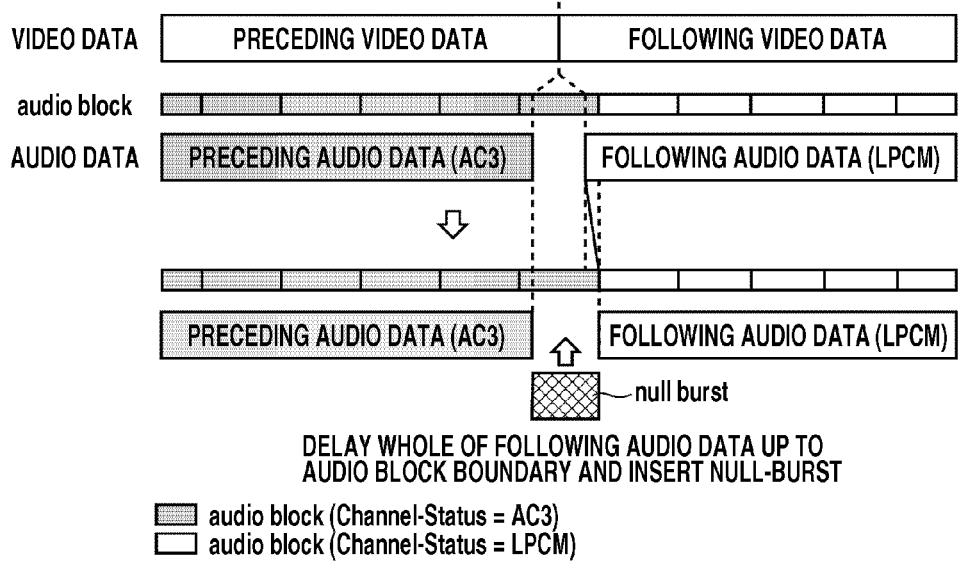

A fourth exemplary embodiment will now be described. An operation will be described in which the audio data output timing of the following moving image contents is delayed until the audio block boundary. FIG. 9 is a flowchart illustrating audio data output process performed in this operation. FIGS. 10A, 10B, and 10C illustrate transmission timing examples.

In step S900, the separating unit 110 detects whether the audio data format switches across a gap in the moving image contents from PSI/SI. As illustrated in FIG. 10A, if the audio data format does not switch across a gap in the moving image contents (both AC3) (NO SWITCH in step S900), the packet processing unit 113 does not perform any specific process, and continues outputting audio data based on the synchronization signal (i.e., the process illustrated in FIG. 9 is finished). As illustrated in FIGS. 10B or 10C, if there is a switch in the audio data format across a gap in the moving image contents (in the illustrated example, a switch from AC3 to LPCM) (SWITCH DETECTED in step S900), the process proceeds to step S901. FIG. 10B illustrates a case in which audio data output of the following moving image contents is not included within the audio block outputting the audio data of the preceding moving image contents. FIG. 10C illustrates a case in which audio data output of the following moving image contents is included within the audio block outputting the audio data of the preceding moving image contents.

In step S901, the separating unit 110 confirms the audio block timing signal from the packet processing unit 113 and the audio data format switching timing. As illustrated in FIG. 10B, if there are no different audio data format output timings in the same audio block (NO MISMATCHES in step S901), the process proceeds to step S903. In step S903, the process required for audio data format switching is performed. Conversely, as illustrated in FIG. 10C, if there are different audio data format output timings in the same audio block (MISMATCH CONFIRMED in step S901), the process proceeds to step S902.

In step S902, the packet processing unit 113 adds a delay to the tail of the audio data in the following moving image contents. The added delay is long enough so that the output timing of the audio data at the start matches the boundary of the next audio block. Consequently, the following audio data is delayed to be placed after the next audio block. Based on this process, the output from the packet processing unit 113 in the case of FIG. 10C becomes the same as that illustrated in FIG. 10B. Consequently, only one type of audio data format is present in the same audio block.

In step S903, the packet processing unit 113 inserts or arranges null-burst data across a gap in the moving image contents between the audio data tail of the preceding moving image contents and the start of the audio data of the following moving image contents.

In step S904, the packet processing unit 113 switches the audio data format signal from the audio block timing which includes the start of the audio data of the following moving image contents. Consequently, a channel status that supports the following moving image contents is output.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-220351 filed Sep. 30, 2010, which is hereby incorporated by reference herein in its entirety.

What is claimed is:

1. An electronic device comprising:
a transmitting unit that (a) transmits first audio data, encoded based on a format, or second audio data that is not encoded based on the format, to an external apparatus, and (b) transmits first information relating to the first audio data or second information relating to the second audio data to the external apparatus; and
a control unit that (c) performs a process for changing information to be transmitted to the external apparatus from the first information to the second information if audio data to be transmitted to the external apparatus is changed from the first audio data to the second audio data, and (d) causes, based on a timing when information to be transmitted to the external apparatus is changed from the first information to the second information, the transmission unit to transmit data for informing that audio data to be transmitted to the external apparatus is changed until information to be transmitted to the external apparatus is changed from the first information to the second information.

2. The electronic device according to claim 1, wherein the control unit causes the transmitting unit to transmit the second audio data to the external apparatus after information to be transmitted to the external apparatus is changed to the second information if audio data to be transmitted for to the external apparatus is changed from the first audio data to the second audio.

3. The electronic device according to claim 1, wherein the data for informing that audio data to be transmitted to the external apparatus is changed includes a null-burst.

4. The electronic device according to claim 1, wherein the control unit causes the transmitting unit to transmit the data for informing that audio data to be transmitted to the external apparatus is changed by discarding data included in the first audio data before the second audio data is transmitted.

5. The electronic device according to claim 4, wherein the data included in the first audio data includes an audio access unit (AAU).

6. The electronic device according to claim 1, wherein the transmitting unit transmits audio data to the external apparatus via an HDMI (High-Definition Multimedia Interface) interface.

7. The electronic device according to claim 1, wherein the first audio data includes audio data corresponding to audio code number 3 (AC3).

8. The electronic device according to claim 1, wherein the second audio data includes audio data corresponding to linear pulse-code modulation (LPCM).

9. The electronic device according to claim 1, wherein the first information includes a channel status relating to the first audio data, and the second information includes a channel status relating to the second audio data.

10. An electronic device, comprising:
a transmitting unit that (a) transmits first audio data, encoded based on a format, or second audio data that is not encoded based on the format, to an external apparatus, and (b) transmits first information relating to the first audio data or second information relating to the second audio data to the external apparatus; and
a control unit that (c) performs a process for changing information to be transmitted to the external apparatus from the second information to the first information if audio data to be transmitted to the external apparatus is changed from the second audio data to the first audio data, and (d) causes, based on a timing when information to be transmitted to the external apparatus is changed from the second information to the first information, controls the transmitting unit to transmit data for informing that audio data to be transmitted to the external apparatus is changed until information to be transmitted to the external apparatus is changed from the second information to the first information.

11. The electronic device according to claim 10, wherein the control unit causes the transmitting unit to the first audio data to the external apparatus after information to be transmitted to the external apparatus is changed to the first information if audio data to be transmitted to the external apparatus is changed from the second audio data to the first audio data.

12. The electronic device according to claim 10, wherein the data for informing that audio data to be transmitted to the external apparatus is changed includes a null-burst.

13. The electronic device according to claim 10, wherein the control unit causes the transmitting unit to transmit data for informing that audio data to be transmitted to the external apparatus is changed by discarding data included in the first audio data after the second audio data is transmitted.

14. The electronic device according to claim 13, wherein the data included in the first audio data includes an audio access unit (AAU).

15. The electronic device according to claim 10, wherein the transmitting unit transmits audio data to the external apparatus via an HDMI (High-Definition Multimedia Interface) interface.

16. The electronic device according to claim 10, wherein the first audio data includes audio data corresponding to audio code number 3 (AC3).

17. The electronic device according to claim 10, wherein the second audio data includes audio data corresponding to linear pulse-code modulation (LPCM).

18. The electronic device according to claim 10, wherein the first information includes a channel status relating to the first audio data, and the second information includes a channel status relating to the second audio data.

19. The electronic device according to claim 1, wherein the data for informing that audio data to be transmitted to the external apparatus is changed is transmitted to the external apparatus since a transmission of the first audio data is ended until a transmission of the second audio data is started.

20. The electronic device according to claim 10, wherein the data for informing that audio data to be transmitted to the external apparatus is changed is transmitted to the external apparatus since a transmission of the second audio data is ended until a transmission of the first audio data is started.

21. A method comprising:
transmitting first audio data, encoded based on a format, or second audio data that is not encoded based on the format to an external apparatus;
transmitting first information relating to the first audio data or second information relating to the second audio data;
performing a process for changing information to be transmitted to the external apparatus from first information to the second information if audio data to be transmitted to the external apparatus is changed from the first audio data to the second audio data; and
transmitting, based on a timing when information to be transmitted to the external apparatus is changed from the first information to the second information, data for informing that audio data to be transmitted to the external apparatus is changed until information to be transmitted to the external apparatus is changed from the first information to the second information.

22. A method comprising:
transmitting first audio data, encoded based on a format, or second audio data that is not encoded based on the format to an external apparatus;
transmitting first information relating to the first audio data or second information relating to the second audio data to the external apparatus;
performing a process for changing information to be transmitted to the external apparatus from the second information to the first information if audio data to be transmitted to the external apparatus is changed from the second audio data to the first audio data; and
transmitting, based on a timing when information to be transmitted to the external apparatus is changed from the second information to the first information, data for informing that audio data to be transmitted to the external apparatus is changed until information to be transmitted to the external apparatus is changed from the second information to the first information.

* * * * *